United States Patent
Robertson et al.

(10) Patent No.: US 8,856,317 B2
(45) Date of Patent: Oct. 7, 2014

(54) SECURE DATA TRANSFER IN A VIRTUAL ENVIRONMENT

(75) Inventors: Matthew Robertson, Santa Clara, CA (US); Rao Sandeep Hebbani Raghavendra, Sunnyvale, CA (US); Qingqing Li, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 547 days.

(21) Appl. No.: 12/804,177

(22) Filed: Jul. 15, 2010

(65) Prior Publication Data
US 2012/0016977 A1 Jan. 19, 2012

(51) Int. Cl.
  *G06F 15/173* (2006.01)
  *H04L 29/06* (2006.01)
  *H04L 29/08* (2006.01)

(52) U.S. Cl.
  CPC ............ *H04L 63/20* (2013.01); *H04L 67/148* (2013.01); *H04L 67/141* (2013.01)
  USPC ............ 709/224; 709/223; 709/227; 709/228

(58) Field of Classification Search
  USPC .................................. 709/223, 224, 227, 228
  See application file for complete search history.

(56) References Cited

U.S. PATENT DOCUMENTS

2003/0110259 A1* 6/2003 Chapman et al. ............. 709/225
2010/0042869 A1* 2/2010 Szabo et al. ....................... 714/4

OTHER PUBLICATIONS

IETF RFC 5246, "The Transport Layer Security (TLS) Protocol Version 1.2." Aug. 2008. [Online] Available: http://tools.ietf.org/html/rfc5246.

IETF, RFC 2818, "HTTP Over TLS." May 2000. [Online] Available: http://tools.ietf.org/html/rfc2818.

VMware, "VMware VMotion for Live Migration of Virtual Machines." Aug. 2009. [Online] Available: http://www.vmware.com/products/vi/vc/vmotion.html.

IETF, RFC 3547, "The Group Domain of Interpretation." Jul. 2003. [Online] Available: http://www.ietf.org/rfc/rfc3547.txt.

Naor, M. and Wieder, U. "A Simple Fault Tolerant Distributed Hash Table." Proc. IPTPS 2003, Lecture Notes in Computer Science 2735, Springer, pp. 88-97.

VMware "VMware vSphere Fault Tolerance—Deliver 24X7 Availability for your Applications." 2009. [Online] Available: http://www.vmware.com/products/fault-tolerance/.

"Key Management Interoperability Protocol (KMIP): Addressing the Need for Standardization in Enterprise Key Management." Version 1.0, May 20, 2009.

Xsigo Virtual I/O Products. [Online] Available: http://www.xsigo.com/products/products_overview.php.

* cited by examiner

*Primary Examiner* — Thu Nguyen
*Assistant Examiner* — Lan-Dai T Truong
(74) *Attorney, Agent, or Firm* — Cindy Kaplan

(57) ABSTRACT

In one embodiment, a method includes receiving at one of a plurality of servers, a request from a client for a secure communication session, storing context information associated with the secure communication session at a virtual context server in communication with the servers, and establishing the secure communication session between one of the servers and the client. The context information includes a session identifier, a secret, and a session state. The stored context information is available to the servers to allow the secure communication session to move between the servers. An apparatus for secure data transfer in a virtual environment is also disclosed.

17 Claims, 5 Drawing Sheets

SECURE DATA TRANSFER IN A VIRTUAL ENVIRONMENT

TECHNICAL FIELD

The present disclosure relates generally to communication networks, and more particularly, to secure data transfer in a virtual environment.

BACKGROUND

In order to provide efficient use of resources and improved reliability, networks are often configured with logical or virtual servers rather than a single entity server. For example, enterprise networks often use a logical server to represent multiple physical devices. Also, many network managers are turning to virtualization so that resources can be shared across a network. Through the use of virtualization, multiple operating systems and applications can run on the same computer at the same time, thereby increasing utilization and flexibility of hardware. Virtualization allows servers to be decoupled from underlying hardware, thus resulting in multiple virtual servers sharing the same physical server hardware. This also allows the virtual server to be moved from one physical server to another physical server.

A secure communication session is often required between a client and the server. In conventional networks, the secure communication session cannot be moved between physical servers without closing an existing communication session and opening a new session. Another drawback with conventional systems is the difficulty in monitoring traffic over the secure communication session.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
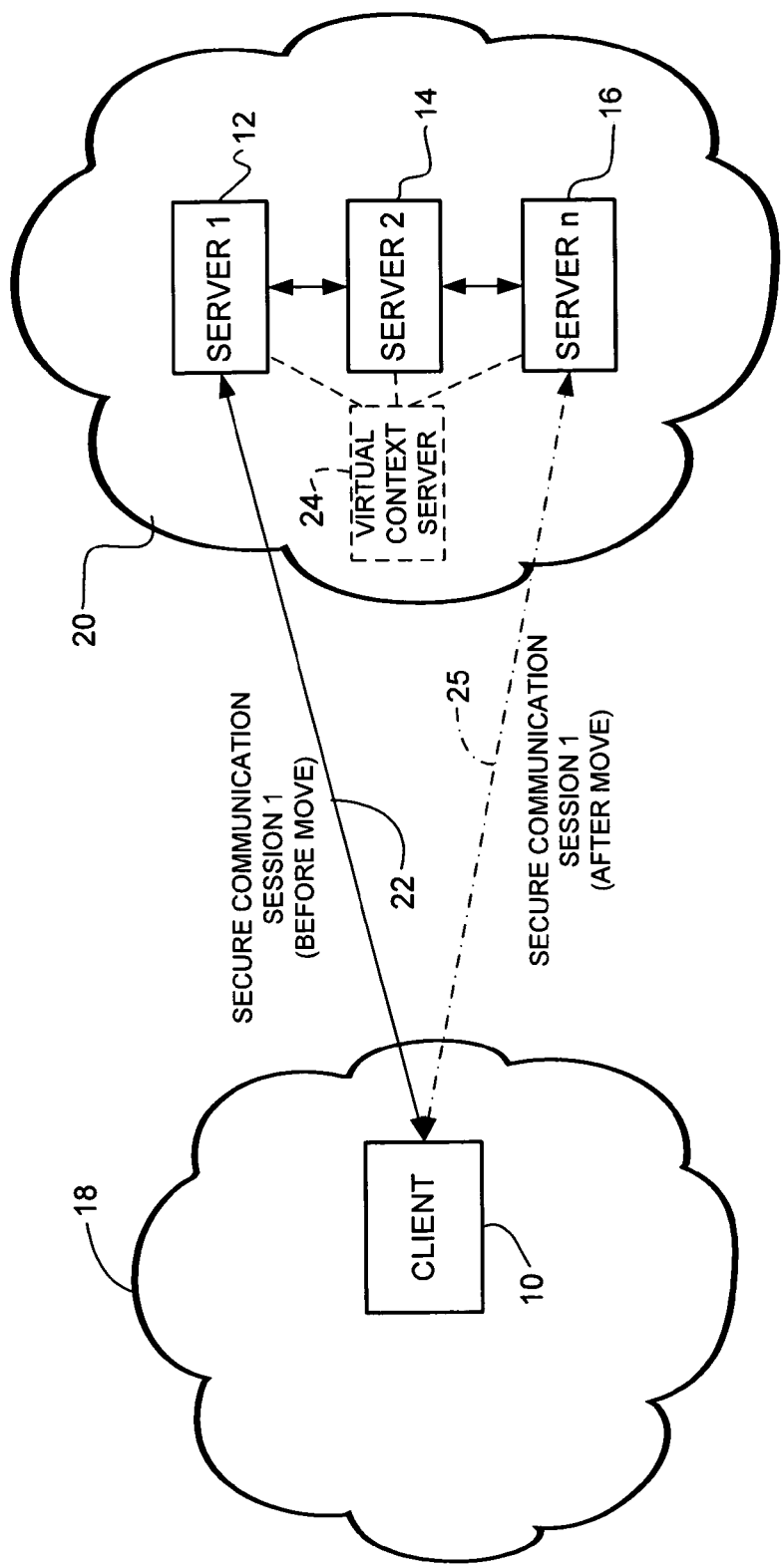
FIG. 1 illustrates an example of a network in which embodiments described herein may be implemented.

In one embodiment, a method generally comprises receiving at one of a plurality of servers, a request from a client for a secure communication session, storing context information associated with the secure communication session at a virtual context server in communication with the servers, and establishing the secure communication session between one of the servers and the client. The context information comprises a session identifier, a secret, and a session state. The stored context information is available to the plurality of servers to allow the secure communication session to move between the servers.

In another embodiment, an apparatus generally comprises a processor for receiving at one of a plurality of servers, a request from a client for a secure communication session, sharing context information associated with the secure communication session with a virtual context server in communication with the servers, and establishing the secure communication session with the client. The apparatus further includes memory for at least temporarily storing the context information. The context information comprises a session identifier, a secret, and a session state. The virtual context server shares the context information with the plurality of servers to allow the secure communication session to move between the servers.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, features relating to technical material that is known in the technical fields related to the embodiments have not been described in detail.

Secure Sockets Layer (SSL) and Transport Layer Security (TLS) protocols are widely used in the Internet for securing communications based on the Transport Control Protocol (TCP). SSL and TLS provide authentication, data integrity, and confidentiality services to parties utilizing the protocol. TLS is used in a variety of applications including, for example, file transfer, email, and remote terminal services and is often used to secure web traffic using HTTP (Hypertext Transfer Protocol) over TLS (referred to as HTTPS (Hypertext Transfer Protocol Secure)).

The SSL/TLS protocols were designed in accordance with a client-server model in which a client initiates an SSL/TLS session with a server. After exchange of information between the client and server and authentication, a secret is shared between the client and server. This shared secret, referred to as a master secret, is used for the remainder of the session to facilitate data integrity and confidentiality.

A drawback with the conventional client-server SSL/TLS model is that it is not possible to transfer a single SSL/TLS session between different servers. With conventional SSL/TLS, the session between the client and a first server needs to be closed and a different session opened with a second server. For example, in a network in which a single application runs on multiple physical devices for redundancy, if one physical device drops a session due to failure or overload, the active SSL/TLS session is closed and a new session needs to be renegotiated upon client request. This can be a computationally intensive operation.

Also, the server in the client-server model may not be a single entity. For example, a web server at an enterprise may be a server farm comprising multiple physical devices. With conventional client-server SSL/TLS, it is not possible to share a single client-server session among the servers within the server farm or transfer a session between different servers.

A further difficulty with the conventional client-server model involves monitoring for the purposes of network performance monitoring, security services, or QoS solutions, for example, which require visibility into traffic utilizing the SSL/TLS protocol. One monitoring approach is to passively act as the server in an SSL/TLS connection to decrypt and inspect the traffic. This approach results in complicated key distribution and maintenance problems, security vulnerabilities, and data leakages. Furthermore, in situations where there is an active migration of virtual servers (described below), the physical location changes and the corresponding network nodes that participate in SSL/TLS inspection will not have information required for continued service application or monitoring.

In a virtualized environment, it may be desired to transfer the SSL/TLS session between virtual machines operating on different physical devices. Multiple virtual machines share hardware resources without interfering with each other so that several operating systems and applications can be run at the same time on a single computer. Software is used to virtualize hardware resources of a computer, including, for example, the CPU (Central Processing Unit), RAM (Random Access Memory), hard disk, and network controller, to create a virtual machine that can run its own operating system and applications. A communication session may be transferred, for example, from a faulty virtual machine to a standby virtual machine on a different physical device. In the case of an SSL/TLS session transfer, if there is a change in network service nodes such as SSL Offload Engine (SOE), load balancer, or monitoring device, the network service nodes will require context information from the secure communication session in order to resume network services.

Context information is created when a secure communication session is established between a server and a client. The context information comprises a session ID, master secret, and session state. The session ID is a unique identifier identifying the session on the server. The master secret is the secret shared between the server and the client, and is used to derive keys for securing data in transit. The session state contains information used to process the next record in the session, including the security association and the next expected packet.

The server may also be located in a cloud network. Cloud computing enables network access to a shared pool of configurable computing resources (e.g., networks, servers, storage, applications, and services) that can be rapidly provisioned and released with minimal management effort. In the cloud computing paradigm, a virtual server operates in a virtual environment and can be scheduled on one of multiple physical entities. The virtual server can actively move between the physical entities while continuing to serve accepted and active connections. In conventional networks, migration of the virtual server between physical devices requires a new secure communication session to be opened.

The embodiments described herein allow for the movement of secure communication sessions (e.g., SSL/TLS sessions) between physical and virtual servers, serving both the same and different applications, as well as sharing the secure communication session with different network devices. As described in detail below, one embodiment virtualizes the SSL/TLS layer by placing the SSL/TLS context into its own cloud to allow the session to pass between different network devices while at the same time allowing a complete end-to-end secure session to exist between the client and the server. The secure communication session is moved from the application layer to the network layer so that the network is aware of the secure communication session. The embodiments described herein utilize a client-server connection; however, the server includes a virtualized entity that exists in a secure, trusted cloud within the network.

The embodiments operate in the context of a data communication network including multiple network elements. Some of the elements in a network that employs the system may be network devices such as servers, switches, or routers. The network device may include, for example, a master central processing unit, interfaces, and a bus. The CPU preferably includes memory and a processor. The network device may be implemented on a general purpose network machine such as described below with respect to FIG. 5.

Referring now to the drawings, and first to FIG. 1, an example of a network that may implement embodiments described herein is shown. A client 10 is in communication with server 1 (12). The client 10 is located in a network 18, such as a TCP/IP network, and the server 12 is located in network 20 (e.g., cloud, data center) along with servers 2 (14) and server n (16). The servers 12, 14, 16 may be, for example, an application server, Server Load Balancer (SLB), SSL Offload Engine (SOE), web server, database server, monitoring device, or other network device. For simplification, only the client 10 and servers 12, 14, 16 are shown. Each network 18, 20 may include any number and arrangement of network devices (e.g., switches, routers, servers, clients). It is to be understood that the simplified network shown in FIG. 1 is only an example, and that the embodiments described herein may be employed in networks having different topologies and types of network devices.

Secure communication session 1 (e.g., SSL session, TLS session) 22 exists between the client 10 and server 12. The secure communication session 22 is end-to-end between the client 10 and server 12. SSL and TLS are used herein as examples of a secure communication protocol utilized to encrypt segments of network connections at the transport layer end-to-end. It is to be understood that the embodiments described herein may use any type of protocol that provides security for communications over a network.

Session context information is stored in a virtual context server 24 that exists in a secure, trusted cloud within the network and shared with the servers 12, 14, 16 so that the session 1 can be moved from one server to another server, as described in detail below. For example, session 1 may be moved from server 12 to server 16, as indicated at 25.

The virtual context server 24 may be located at one of the servers 12, 14, 16, (e.g., virtual machine at server) or another network device (e.g., server, host, physical appliance, SOE). The virtual context server 24 may be implemented, for example, in a Virtual Ethernet Module (VEM) of a virtual switch (e.g., NEXUS 1000, available from Cisco Systems, Inc. of San Jose, Calif.). The virtual context server 24 may also be associated with a performance monitoring application, load balancing application, or any other software installed at a server or other network device. In one embodiment, the virtual context server 24 comprises a session context server 40 and context store 42, as shown in FIG. 2.

Figure 2:
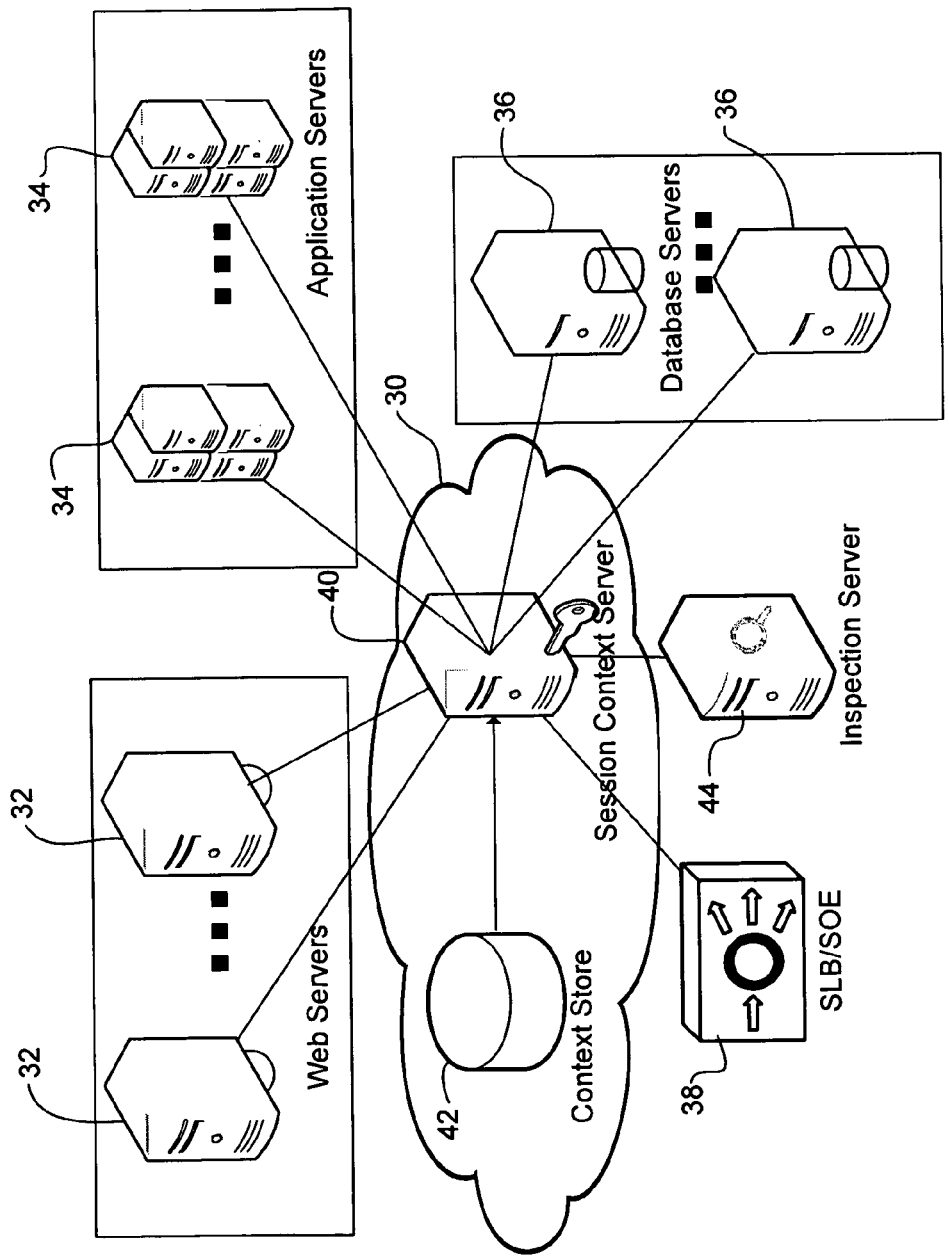
FIG. 2 illustrates sharing of security session context information between servers in the network of FIG. 1, in accordance with one embodiment.
Figure 3:
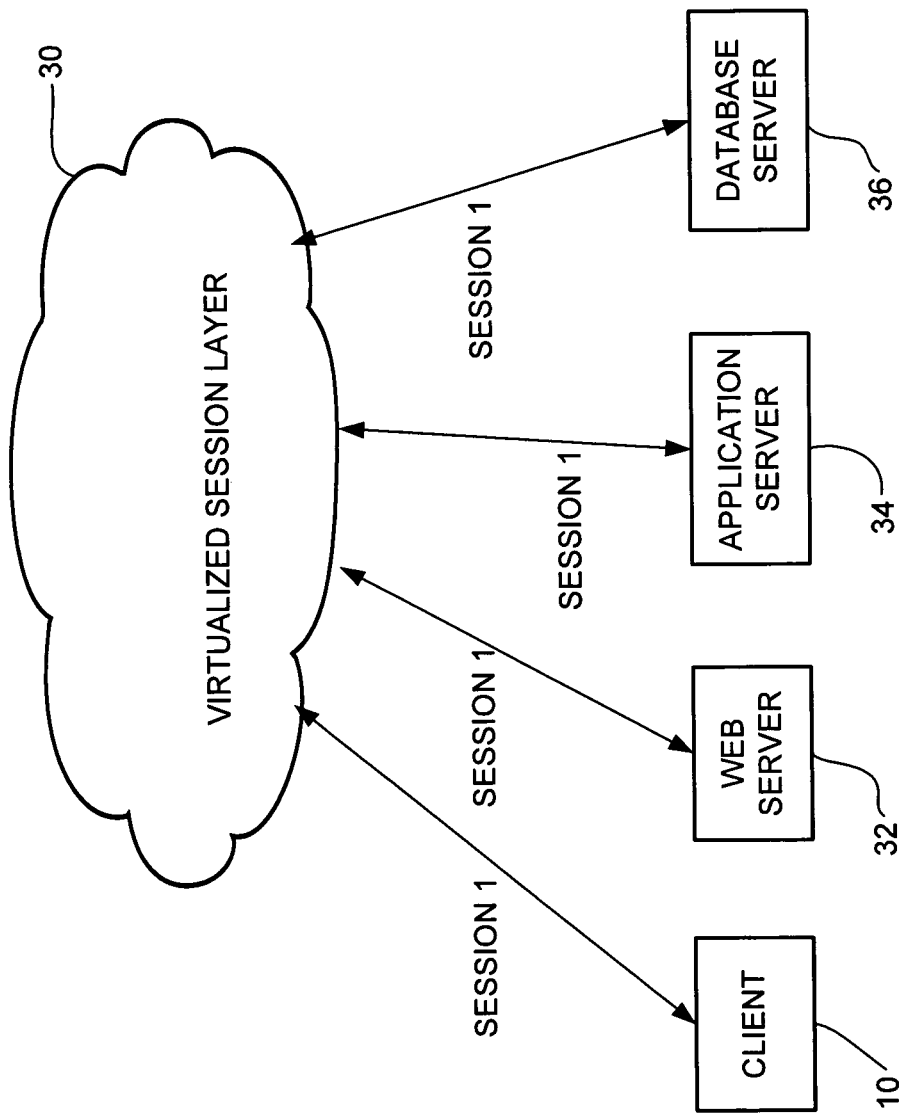
FIG. 3 illustrates a virtualized secure communication session between a client and the servers of FIG. 2.

The SSL/TLS layer is virtualized through the sharing of the SSL/TLS session context among multiple interested devices (FIGS. 2 and 3). The interested devices may include, for example, a logical server comprising multiple virtual or physical server entities, multiple different logical servers (e.g., web servers 32, application servers 34, database servers 36), SLBs/service accelerators 38, or network monitoring solutions (e.g., inspection server 44). As shown in FIG. 3, the same secure session 1 with the client 10 can be moved between any of the physical devices associated with the virtualized session layer 30. Session 1, as viewed from the client 10, is a continuous secure communication session and there is no need to close, open, or renegotiate a new session upon moving the session between servers.

In one embodiment, a central entity, referred to herein as a virtualized server or virtual context server, is used. This entity is central in the sense that interested parties in a secure communication context sharing cloud will either write a new session context to the virtualized server or obtain existing session context from the virtualized server. As shown in FIG.

2, the virtualized server comprises a session context server 40 and context store 42 in cloud 30. The context store 42 is a reliable, secure drive that exists somewhere on the network and is accessed by the context server 40. The context store drive 42 is preferably redundant so that it is not a single point of failure in the system.

The session context server 40 may be identified by interested entities through the use of a URL (Uniform Resource Locator), for example, and may exist anywhere in the network cloud. The virtual context server 40 may reside in the cloud as a virtual machine or may be embedded into an SSL Offload Engine (SOE) 38 or other entities interested in handoff, take-over, and resuming active secure communication session services upon live migration of a virtual server, for example. The virtualized server allows multiple interested devices to be configured as part of the same security domain and become active or passive participants in a single secure communication session. The overlay connectivity between the servers facilitates the queried context server to procure the requested session context from its source.

Figure 4:
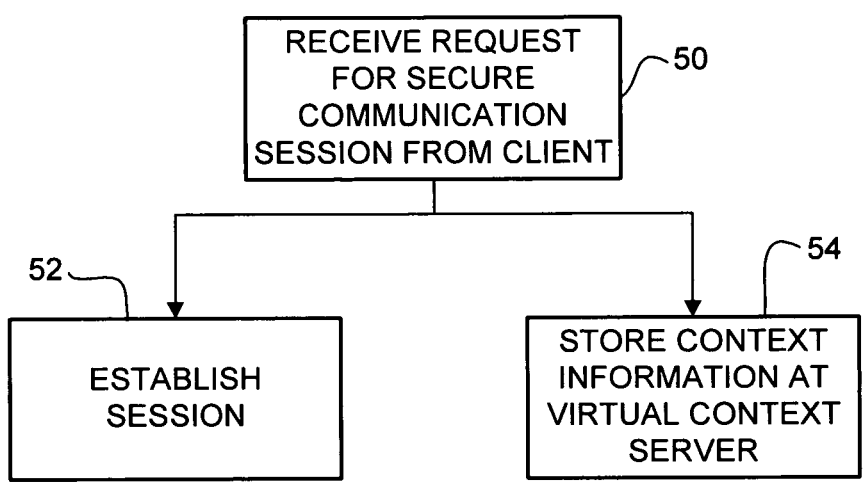
FIG. 4 is a flowchart illustrating an overview of a process for secure data transfer in the network of FIG. 1, in accordance with one embodiment.

FIG. 4 is a flowchart illustrating an overview of a process for secure data transfer in a virtual environment, in accordance with one embodiment. At step 50 a network device (e.g., server 12) receives a request for a secure communication session from a client 10. The server may establish, for example, an SSL/TLS session using conventional SSL/TLS protocol (step 52). Establishment of the session includes, for example, an SSL/TLS handshake (client Hello, server Hello, certificate message, client key exchange, etc.), digital certificate exchange, and generation of session keys. In addition to establishing the secure communication session (step 52), the server also shares and stores context information with the virtual context server 24 (step 54). The context information includes a session identifier, secret, and session state. It is to be understood that the term 'context information' as used herein refers to any information that can be used to identify a secure communication session, associated secret, and status of the session. Step 54 may occur as soon as the server receives a client Hello, for example. This allows another network device to finish the handshake in the event the session is moved to another server before the session has been fully established.

In one embodiment, storing context information comprises transmitting the context information to a central location (e.g., session context server 40 in FIG. 2). When a new session is established between the client and server, the server shares the session context information with the session context server 40, which stores the context information in the context store 42. If the client session subsequently moves to a different server (e.g., server 16 in FIG. 1), the new server obtains the session context information from the virtual context server 24, the client 10 attempts to resume the session using the secure communication protocol, and the same secure communication session seamlessly continues.

In another embodiment, the server that establishes the initial secure communication session with the client 10 shares the context information with the other servers within the cloud that are allowed access to the secure communication session. The virtual context server is distributed throughout the cloud and is stored at each server.

Virtualization of the context server 40 may be accomplished by decentralizing and distributing context server content into multiple context servers in the cloud through the use of a fault tolerant Distributed Hash Table (DHT), for example. The DHT based approach extends a single context server to multiple distributed context servers that will provide the context service with an overlay connectivity therebetween. The context resides in the context store of the primary owner (creator) of the context and is also duplicated in another node or a set of nodes for redundancy.

Once the context information is shared with the virtual context server 24, the secure communication session can seamlessly move from one server to another server. For example, the secure communication session can be moved between servers hosting the same or different applications. In one example, the virtual context server is used in the event of a failure (hardware or software) in a first application server 34. The existing session at the first application server 34 is taken over by the second (backup) application server without any renegotiation between the client and server. In another example, a virtual machine is moved from one server to another server due to load changes and available resources. The secure communication session is moved between the servers and follows migration of the virtual machine.

The secure communication protocol continues to operate with no impact on the client's operation. The virtualized communication layer is transparent to the client and server. Devices not in the client-server connection, such as monitoring device 44, will have access to the context server 40 to retrieve the session context and have visibility into the session, regardless of the migration pattern of the session between servers in the network.

Security of the SSL/TLS protocol is maintained as communication between all of the entities in the virtualized SSL/TLS cloud is performed securely. Communication between the servers 12, 14, 16 is performed over a secure data plane, separate from the data plane over which the SSL session 22 is established (FIG. 1). In one embodiment, secure communication is provided through the use of configurable trusted groups. Communication between the servers may be accomplished, for example, through the use of Group Domain of Interpretation (GDOI). This will ensure that the session context information is only available to those devices that are configured to have access and the security services provided by the SSL/TLS protocol remain intact.

Access to the secure data plane between the session context server 40 and servers 32, 34, 36, 38 may be determined based on access control lists (ACLs) or role based authorization using policies established utilizing a policy control engine, for example. A management infrastructure can be used to establish different groups and provision which entities can view which SSL/TLS sessions. Additionally, the context server 40 can be configured to only share traffic from specified servers with the monitoring device 44, therefore allowing a higher level of security and privacy.

The secure communication channel is made available to monitoring devices within the server's domain to enable simultaneous active processing and passive monitoring on a single SSL/TLS session. The network monitoring devices (e.g., inspection server 44) can be configured to be part of the virtualized group, connect to the session context server 40, and obtain the context information for any secure communication sessions that the devices need to inspect. This greatly simplifies the configuration of the monitoring devices. Since the monitoring device is able to obtain the context information, inspection is possible where the virtualized server moves to a different area in the network under the domain of a separate inspection device. In one example, an offline performance monitoring device is provided visibility into the secure communication session in a virtual data center.

Figure 5:
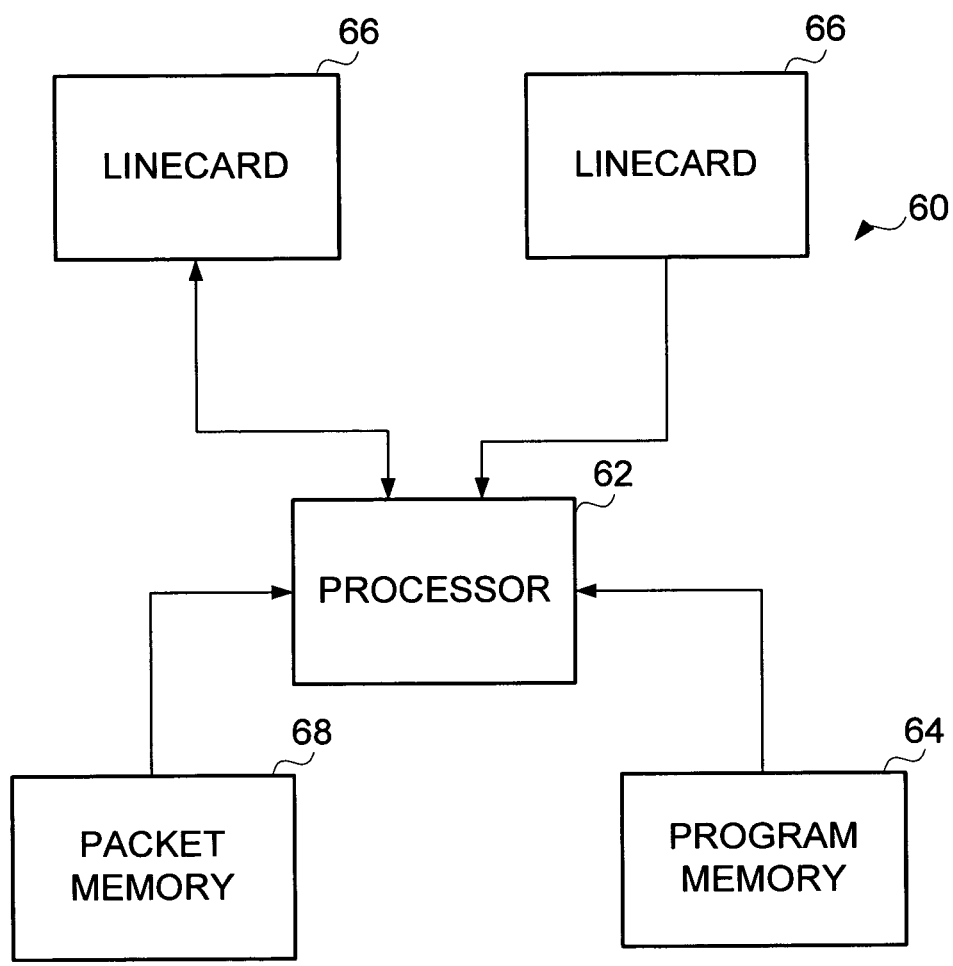
FIG. 5 depicts an example of a network device useful in implementing embodiments described herein.

FIG. 5 depicts a network device 60 that may be used to implement embodiments described herein. Network device 60 is configured to implement all of the network protocols and extensions thereof described herein. In one embodiment, network device 60 is a programmable machine that may be implemented in hardware, software, or any combination thereof Logic may be encoded in one or more tangible media for execution by a processor 62. For example, processor 62 may execute codes stored in a program memory 64. Program memory 64 is one example of a computer-readable medium. Program memory 64 can be a volatile memory. Another form of computer-readable medium storing the same codes is .a type of non-volatile storage such as floppy disks, CD-ROMs, DVD-ROMs, hard disks, flash memory, etc.

Network device 60 interfaces with physical media via a plurality of linecards (network interfaces) 66. Linecards 66 may incorporate Ethernet interfaces, DSL interfaces, Gigabit Ethernet interfaces, 10-Gigabit Ethernet interfaces, SONET interfaces, etc. As packets are received, processed, and forwarded by network device 60, they may be stored in a packet memory 68. To implement functionality according to the system, linecards 66 may incorporate processing and memory resources similar to those discussed above in connection with the network device as a whole. It is to be understood that the network device 60 shown in FIG. 5 and described above is only one example and that different configurations of network devices may be used.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving at one of a plurality of servers, a request from a client for a secure communication session comprising a Secure Socket Layer (SSL) or Transport Layer Security (TLS) session;
establishing said secure communication session directly between one of said plurality of servers and the client;
sharing context information associated with said secure communication session with a virtual context server in communication with said plurality of servers and operable to store said context information, said context information comprising a session identifier, a secret, and a session state, wherein said context information stored at the virtual context server is available to said plurality of servers to allow said secure communication session to move between said plurality of servers; and
moving said secure communication session with said client from one of said plurality of servers to another of said plurality of servers;
wherein said plurality of servers belong to a trusted group configured to have access to said secure communication session and said secret, said secret used in said secure communication session to provide data integrity and confidentiality.

2. The method of claim 1 wherein said plurality of servers comprises physical servers located within a cloud network.

3. The method of claim 1 wherein said plurality of servers comprises virtual machines located at one or more of the servers and configured to move between the servers.

4. The method of claim 1 wherein said plurality of servers comprises one or more logical groups of physical servers.

5. The method of claim 1 wherein at least one of said plurality of servers comprises a monitoring device for monitoring traffic over said secure communication session.

6. The method of claim 1 wherein the virtual context server comprises a session context server and a redundant context store.

7. An apparatus comprising:
a processor for receiving at one of a plurality of servers, a request from a client for a secure communication session comprising a Secure Socket Layer (SSL) or Transport Layer Security (TLS) session, establishing said secure communication session directly between one of said plurality of servers and the client, and sharing context information associated with said secure communication session with a virtual context server in communication with said plurality of servers and operable to store said context information, said context information comprising a session identifier, a secret, and a session state; and
memory for at least temporarily storing said context information;
wherein the virtual context server shares said context information with said plurality of servers to allow said secure communication session to move between said plurality of servers; and
wherein the apparatus is operable to belong to a trusted group comprising said plurality of servers and configured to have access to said secure communication session and said secret, said secret configured for use in said secure communication session to provide data integrity and confidentiality.

8. The apparatus of claim 7 wherein said plurality of servers comprises physical servers located within a cloud network.

9. The apparatus of claim 7 wherein said plurality of servers comprises virtual machines located at one or more of the servers and configured to move between the servers.

10. The apparatus of claim 7 wherein said plurality of servers comprises one or more logical groups of physical servers.

11. The apparatus of claim 7 wherein at least one of said plurality of servers comprises a monitoring device for monitoring traffic over said server communication session.

12. The apparatus of claim 7 wherein the virtual context server comprises a session context server and a redundant context store.

13. The apparatus of claim 7 wherein the processor is further configured to communicate said context information over a secure data plane containing said plurality of servers.

14. Logic encoded in one or more non-transitory media for execution and when executed operable to:
receive at one of a plurality of servers, a request from a client for a secure communication session comprising a Secure Socket Layer (SSL) or Transport Layer Security (TLS) session;
establish said secure communication session directly between the client and the server receiving said request; and
share context information associated with said secure communication session with a virtual context server in communication with said plurality of servers and operable to store said context information, said context information comprising a session identifier, a secret, and a session state, wherein said context information stored at the virtual context server is available to said plurality of servers to allow said secure communication session to move between said plurality of servers;
wherein said plurality of servers are operable to belong to a trusted group configured to have access to said secure communication session and said secret, said secret configured for use in said secure communication session to provide data integrity and confidentiality.

15. The logic of claim 14 wherein the logic is operable to:
identify a virtual machine;
obtain new context information; and
continue an existing secure communication session between said virtual machine and another client.

16. The logic of claim 14 wherein said plurality of servers comprises physical servers located within a cloud network.

17. The logic of claim 14 wherein said plurality of servers comprises virtual machines located at one or more of the servers and configured to move between the servers.

* * * * *